United States Patent [19]

Fox et al.

[11] 4,122,037

[45] Oct. 24, 1978

[54] PREPARATION OF AN AQUEOUS SOLUTION CONTAINING IONS OF AT LEAST MANGANOUS AND BROMIDE IONS FROM A WATER SOLUBLE MANGANOUS SALT AND ELEMENTAL BROMINE

[75] Inventors: Joseph D. Fox, Joliet; George E. Kuhlmann, Lisle; Ricky L. Wittman, Montgomery, all of Ill.

[73] Assignee: Standard Oil Company a corporation of Indiana, Chicago, Ill.

[21] Appl. No.: 861,457

[22] Filed: Dec. 16, 1977

[51] Int. Cl.$^2$ .................. B01J 27/08; B01J 31/32; C07C 63/02
[52] U.S. Cl. .................. 252/429 R; 252/441; 562/412; 562/549
[58] Field of Search .................. 252/429 R, 441; 260/524 R

[56] References Cited

U.S. PATENT DOCUMENTS

| | | | |
|---|---|---|---|
| 2,833,816 | 5/1958 | Saffer et al. | 252/441 |
| 3,293,292 | 12/1966 | Olivier et al. | 260/533 R |
| 3,674,845 | 7/1972 | Reni et al. | 252/429 R |
| 3,683,016 | 8/1972 | Darin et al. | 260/524 R |
| 3,686,293 | 8/1972 | Gualdi et al. | 252/429 R |

*Primary Examiner*—P. E. Konopka
*Attorney, Agent, or Firm*—Fred R. Ahlers; Arthur G. Gilkes; William T. McClain

[57] ABSTRACT

This invention relates to the preparation of the subject aqueous solution from a non-bromine manganous salt. More specifically this invention pertains to a critical order of dissolving such salt and elemental bromine and to the use of an anti-oxidant for the manganous ion to prevent its conversion to hydrated manganous dioxide: $MnO(OH)_2$. According to "A Comprehensive Treatise On Inorganic And Theoretical Chemistry", J. W. Mellor, Vol. XII at pages 189 and 259 (published by Longmans, Green and Co., 1947) hydrated manganous dioxide results from the oxidation of a solution of manganous salt with chlorine, bromine, hypochlorous acid, hydrogen peroxide, etc. Such oxidation of a solution of manganous acetate was specifically mentioned. Such hydrated manganous dioxide is described as a white solid product which upon standing in contact with air becomes a dark brown to black product identified as $MnO_2$. The same reference at page 381 reports the preparation of manganous bromide by reaction of bromine with a solution of manganous oxide. We have found that the addition of bromine gas or liquid to a stirred aqueous solution containing manganous ions from a source other than manganous bromide caused the formation of a precipitate which contains the previously dissolved manganese component. The same precipitate formed upon addition of manganous acetate tetrahydrate to a stirred aqueous solution of elemental bromine.

9 Claims, No Drawings

PREPARATION OF AN AQUEOUS SOLUTION CONTAINING IONS OF AT LEAST MANGANOUS AND BROMIDE IONS FROM A WATER SOLUBLE MANGANOUS SALT AND ELEMENTAL BROMINE

STATEMENT OF THE INVENTION

We have now found that the manganous ion will not be precipitated from aqueous solution when a water-soluble manganous salt other than the bromide is added to an aqueous solution of elemental bromine formed by adding elemental bromine as a liquid or gas to water containing a readily oxidizable water soluble compound whose oxidized product is preferably also water-soluble.

It is also known that bromine reacts with water as it dissolves therein to form both hydrogen bromide and hypobromide (HOBr). The latter, having a short stability life, is converted to hydrogen bromide and oxygen: $HOBr \rightarrow HBr + \frac{1}{2} O_2$ and, thus may provide oxygen for the oxidation which precipitates the manganous ion from solution. In a like manner, chlorine also reacts with water as it dissolves therein. But the foregoing reference reports that $Cl_2$ and HOCl individually acts as an oxidizing agent to precipitate hydrated manganous dioxide from aqueous solution of manganous ion. Hence it would appear that bromine as well as chlorine, would not have to go through the respective hypohalide and its conversion to hydrohalide and liberate oxygen as the oxidant precipitating manganous ion from solution as the hydrated manganous dioxide.

Formation and persistance of the hydrated manganous dioxide, which changes to the dark manganic dioxide ($MnO_2$), occurs even when a stoichiometric or more than a stoichiometric amount of bromine (stoichiometric with respect to formation of $MnBr_2$) is added to an aqueous solution having a rather high concentration of manganous ion, e.g., solution saturated with manganous acetate. Such persistance of the hydrated manganous dioxide is unusual because it is known to react with bromine (according to page 381 of the above reference) to form manganous bromide.

It is known from U.S. Pat. No. 2,833,816 and from British Patent Specification No. 833,438 that for catalytic liquid phase oxidation of alkylated aromatic hydrocarbons with molecular oxygen exceptionally useful catalysis is provided by the combination of manganous ion and bromide ion alone or in further combination with the ion of one or more other variable or polyvalent metal. For example, the catalysis provided by ions of Mn, Co and Br or Mn, Ce, Co and Br.

For catalysis provided by ions of Mn and Br, the gram atom ratio of Br to Mn can be in the range of from 0.1:1 up to 10:1. At such ratios below 2:1 the solution containing such ions provide a solution of mixed salt wherein in addition to the bromide ion there is also present the ion of the originally dissolved water-soluble manganous salt which generally is a salt of an organic acid such as an acetate or propionate.

The aqueous solution of ions comprising at least a manganous ion and a bromide ion prepared according to this invention can be used per se in the catalytic liquid phase oxidations conducted in water as reaction medium according to the above British Pat. No. 833,438 or in acetic acid as the reaction medium according to U.S. Pat. No. 2,833,816 or in the oxidation of n-butane according to U.S. Pat. No. 3,293,292.

For the preparation of such solutions containing the ions comprising at least the manganous and bromide ions, the easily oxidizable water-soluble compound can be a water soluble alcohol or aldehyde. Such alcohol or aldehyde is oxidized to products which are themselves water soluble and remain in solution as a water-soluble derivative, e.g. acid, upon addition of bromine to the water. For example, formaldehyde or methanol dissolved in the water before bromine addition are converted mainly to formic acid. Ethanol and acetaldehyde are converted to acetic acid and n-propanol and propionaldehyde are converted to propionic acid in the aqueous solution thereof upon bromine addition. Then the manganous salt, even the carbonate, can be added to the aqueous solution following such addition of bromine to form the aqueous solution containing ions comprising manganous and bromide ions without the precipitation from solution of the hydrated manganous dioxide which can or does then form rather insoluble $MnO_2$.

The minimum easily oxidized organic compound to be used is based on one gram mole of bromine, 1.0 gram mole of aldehyde, or 0.5 gram mole of alcohol. There is no disadvantage, other than economic, of using more than those minimum amounts.

The present inventive technique for preparing aqueous solution containing ions comprising at least manganous and bromide ions is useful for the preparation of such aqueous solutions also containing ions of cobalt, cerium and cobalt and cerium. To prepare such solutions a water-soluble salt of cerium and/or cobalt is dissolved in the water before or after adding the easily oxidized, water soluble organic compound (alcohol or aldehyde) and the bromine. Such salts of Co and/or Ce when dissolved in water do not form precipitates upon bromine addition to the solution in the absence of the easily oxidizable organic compound. Such aqueous solutions containing ions of Mn, Co and Br; Mn, Ce and Br; or Mn, Co, Ce and Br can be added per se to water or to acetic acid used as oxidation solvent reaction medium for the preparation of aromatic carboxylic acids according, respectively to the British Pat. No. 833,438 and U.S. Pat. No. 2,833,816 or No. 3,683,016 or the solution of Mn, Co and Br added to the acetic acid reaction medium used for the oxidation of n-butane according to the process of U.S. Pat. No. 3,293,292.

The present inventive preparation of aqueous solutions of ions comprising at least manganous and bromide ions can be conducted at an operating temperature of from 15° C up to 100° C at ambient atmospheric pressure or at super-atmospheric pressure to assist rapid dissolving of bromine and to protect the environment from contamination with bromine. Preferably the operating temperature is in the range of from 40° C up to 100° C to enhance reaction between the oxidant bromine, hypobromous acid (HOBr), hydrogen bromide and/or in situ formed oxygen with the easily oxidizable organic compound. Also intimately mixing the water solvent and bromine, liquid or gas $Br_2$, is desirable for rapid solution formation and reaction with the easily oxidizable organic compound.

The following illustrative examples are presented to aid and guide persons skilled in this art to more fully understand the present invention and to enable such persons to practice the present invention.

EXAMPLE 1

An aqueous solution containing bromide ion and manganous ion in the respective gram atom ratio of 0.5:1.0 can be prepared in a tank-type vessel closed at the top and bottom portions thereof and having an axial downflow turbine on the bottom of a power shaft extending through a seal member in the top closure so that said turbine is about mid-level position of the vessel, a valved dip-leg and a valved liquid charging line both extending through the top closure down into the vessel and terminating near the bottom thereof, closable means in the top closure for charging solids to the vessel, a valved discharge outlet in the bottom closure, and means for heating the contents of the vessel. To said vessel there is charged through the valved liquid charging line 45.4 kg of water and 1.68 kg of acetaldehyde. Nitrogen is charged into the vessel to a gauge pressure of 3–4 kg/cm$^2$. The mixture is stirred and heated to 50° C and then 6.09 kg of bromine (liquid) is slowly added thrugh the valved dip-leg into the stirred aqueous mixture. Thereafter 37.7 kg of manganous acetate tetrahydrate is added thereto; e.g., by screw conveyor, through the top solids charging means. The manganous acetate dissolves without the formation of hydrated manganous dioxide precipitate. The resulting solute is effectively the half bromide, half acetate manganous salt. From an analysis of the solution it will be found that no acetaldehyde is present and the solution contains acetic acid above that provided by the manganous acetate in an amount equivalent to the acetaldehyde charged.

EXAMPLE 2

An aqueous solution containing bromide and manganous ions in the respective Br:Mn gram atom ratio of 1.47:1.0 can be prepared by the method and in the apparatus of Example 1. For example, 5 kg of acetaldehyde in 45.4 kg of water is stirred and heated to 50° C under a nitrogen gauge pressure of 3 to 4 kg/cm$^2$. Thereafter 18.1 kg of bromine liquid preheated to 40° C is added slowly to the stirred aqueous solution through the valved dip-leg charging line. A sample of the resulting solution upon analysis will indicate the presence of acetic acid and not acetaldehyde. Finely ground manganous acetate tetrahydrate in an amount of 37.7 kg is added to the stirred solution by way of a screw conveyor. The manganous acetate dissolves without forming hydrated manganous dioxide precipitate.

EXAMPLE 3

An aqueous solution containing bromide and manganous ions in a Br:Mn gram atom ratio of 3:1 can be prepared by the method and in the apparatus of Example 1. For example, 5.3 kg of ethanol and 45.4 kg of water are charged to the reaction vessel, stirred, and heated to 80° C under a nitrogen gauge pressure of 4 kg/cm$^2$. Thereafter 36.8 kg of bromine liquid preheated to 60° C are slowly added to the aqueous solution. Finely ground manganous acetate tetrahydrate in an amount of 37.7 kg are added to the stirred solution via a screw conveyor to the stirred solution. The manganous acetate readily dissolved and did not form hydrated manganous dioxide.

EXAMPLE 4

An aqueous solution containing bromide and manganous ions in a Br:Mn gram atom ratio of 10:1 can be prepared by the method and in the apparatus of Example 1. For example, 33.7 kg of acetaldehyde and 45.4 kg of water are charged to the reaction vessel, stirred, and heated to 40° C under a nitrogen gauge pressure of 3 kg/cm$^2$. Thereafter 122.6 kg of bromine liquid at 20° C are slowly added to the aqueous solution. Finely ground manganous acetate tetrahydrate in an amount of 37.7 kg are added to the stirred solution via a screw conveyor to the stirred solution. The manganous acetate readily dissolved and did not form hydrated manganous dioxide.

EXAMPLE 5

An aqueous solution containing bromide and manganous ions in a Br:Mn gram atom ratio of 1:1 can be prepared by the method and in the apparatus of Example 1. For example, 1.8 kg of ethanol and 45.4 kg of water are charged to the reaction vessel, stirred, and heated to 100° C under a nitrogen gauge pressure of 5 kg/cm$^2$. Thereafter 12.25 kg of bromine gas at 80° C are slowly added to the aqueous solution. Finely ground manganous acetate tetrahydrate in an amount of 37.7 kg are added to the stirred solution via a screw conveyor to the stirred solution. The manganous acetate readily dissolved, and did not form hydrated manganous dioxide.

EXAMPLE 6

An aqueous solution containing bromide and manganous ions in a Br:Mn gram atom ratio of 2:1 can be prepared by the method and in the apparatus of Example 1. For example, 13.2 kg of formalin (35% CH$_2$O) and 36.8 kg of water are charged to the reaction vessel, stirred, and heated to 40° C under a nitrogen gauge pressure of 2 kg/cm$^2$. Thereafter 24.5 kg bromine liquid at 40° C are slowly added to the aqueous solution. Finely ground manganous acetate tetrahydrate in an amount of 37.7 kg are added to the stirred solution via a screw conveyor to the stirred solution. The manganous acetate readily dissolved without forming hydrated manganous dioxide.

EXAMPLE 7

An aqueous solution containing bromide and manganous ions in a Br:Mn gram atom ratio of 2:1 can be prepared by the method and in the apparatus of Example 1. For example, 2.46 kg of methanol dissolved in 45.4 kg of water are charged to the reaction vessel, stirred, and heated to 65° C under a nitrogen gauge pressure of 5 kg/cm$^2$. Thereafter 24.5 kg of bromine liquid preheated to 60° C are slowly added to the aqueous solution. Finely ground manganous acetate tetrahydrate in an amount of 37.7 kg are added to the stirred solution via a screw conveyor to the stirred solution. The manganous acetate readily dissolved, did not form hydrated manganous dioxide.

EXAMPLE 8

An aqueous solution containing bromide and manganous ions in a Br:Mn gram atom ratio of 2:1 can be prepared by the method and in the apparatus of Example 1. For example, 4.6 kg of n-propanol and 45.4 kg of water are charged to the reaction vessel, stirred, and heated to 100° C under a nitrogen gauge pressure of 20 kg/cm$^2$. Thereafter 24.5 kg bromine gas at 80° C are slowly added to the aqueous mixture. Finely ground manganous acetate tetrahydrate in an amount of 37.7 kg are added to the stirred solution via a screw conveyor to the stirred solution. The manganous acetate readily dissolved and did not form hydrated manganous dioxide.

EXAMPLE 9

An aqueous solution containing bromide and manganous ions in a Br:Mn gram atom ratio of 2:1 can be prepared by the method and in the apparatus of Example 1. For example, 8.9 kg of n-propionaldehyde and 45.4 kg of water are charged to the stirred reaction vessel, stirred, and heated to 50° C under a nitrogen gauge pressure of 5 kg/cm$^2$. Thereafter 24.5 kg of bromine liquid at 50° C are slowly added to the aqueous mixture. Finely ground manganous acetate tetrahydrate in an amount of 37.7 kg are added to the stirred solution via a screw conveyor to the stirred solution. The manganous acetate readily dissolved did not form hydrated manganous dioxide.

EXAMPLE 10

An aqueous solution containing bromide and manganous ions in a Br:Mn gram atom ratio of 2:1 can be prepared by the method and in the apparatus of Example 1. For example, 2.5 kg of methanol dissolved in 45.4 kg of water are charged to the reaction vessel, stirred, and heated to 65° C under a nitrogen gauge pressure of 5 kg/cm$^2$. Thereafter 24.6 kg of bromine liquid at 50° C are slowly added to the aqueous solution. Finely ground manganous carbonate in an amount of 17.6 kg are added to the stirred solution via a screw conveyor to the stirred solution. The manganous carbonate readily dissolved without forming hydrated manganous dioxide.

In the preparation of aqueous solutions containing cobaltous ions in addition to manganous ions, it is desirable that the water used to dissolve the cobalt salt, especially cobaltous acetate tetrahydrate also contain at least one weight percent but preferably from 2 to 5 weight percent acetic acid.

EXAMPLE 11

An aqueous solution containing cobaltous, manganous and bromide ions in the respective Co:Mn:Br gram atom ratio of 1.0:0.05:2.0 can be prepared in the apparatus of Example 1 using the following ingredients and order of reactants. To the reaction vessel there are first charged 49 kg water, 3.32 kg ethanol and 1.0 kg acetic acid. This solution is stirred and heated to 80° C. Then 35.25 kg ground cobaltous acetate tetrahydrate are added via a screw conveyor to the hot stirred solution. Thereafter the reaction vessel is closed and nitrogen gas is added to a gauge pressure of 5 kg/cm$^2$ through the valved charging line. Then 23.1 kg of bromine gas at 60° C is added slowly to the hot stirred aqueous solution followed by the addition of 1.69 kg of ground (manganous acetate tetrahydrate). Said manganous salt rapidly dissolved without the formation of hydrated manganous dioxide.

The following ten preparations of aqueous solutions containing cobaltous, manganous and bromide ions are shown in TABLES I and II which follow. In these tables the ingredients are combined in the order shown. The aqueous solution of acetic acid and oxidizable organic compound are prepared at 60° C and atmospheric pressure in a stirred three liter glass flask which could be heated or cooled by the appropriate external bath. During the addition of bromine liquid at 25° C, the stirred solution is maintained at a temperature between 60° C and 65° C. The amount of each ingredient in grams is given in those tables except for the Co:Mn:Br ratio which is, of course, the respective gram atoms ratio based on one gram atom of cobalt.

TABLE I

| Ingredient | Example Number | | | | | |
|---|---|---|---|---|---|---|
| | 12 | 13 | 14 | 15 | 16 | 17 |
| Water, grams | 1089 | 1089 | 1089 | 1089 | 1089 | 1089 |
| Cobaltous Acetate Tetrahydrate, grams | 278.5 | 278.5 | 278.5 | 278.5 | 278.5 | 278.5 |
| Acetic Acid, grams | 22 | 22 | 22 | 22 | 22 | 22 |
| Acetaldehyde, grams | 23.4 | 0 | 36.6 | 0 | 48.8 | 0 |
| Ethanol, grams | 0 | 12.3 | 0 | 18.9 | 0 | 27.1 |
| Bromine, grams | 70.9 | 70.9 | 106.3 | 106.3 | 141.7 | 141.7 |
| Manganous Acetate Tetrahydrate, grams | 814.9 | 814.9 | 814.9 | 814.9 | 814.9 | 814.9 |
| Co:Mn:Br | 1:3:0.8 | 1:3:0.8 | 1:3:1.2 | 1:3:1.2 | 1:3:1.6 | 1:3:1.6 |

TABLE II

| Ingredient | Example Number | | | | |
|---|---|---|---|---|---|
| | 18 | 19 | 20 | 21 | 22 |
| Water, grams | 1089 | 1089 | 1089 | 1089 | 1089 |
| Cobaltous Acetate Tetrahydrate, grams | 278.5 | 278.5 | 278.5 | 278.5 | 278.5 |
| Cerous Acetate, grams | 0 | 0 | 0 | 0 | 176.6 |
| Acetic Acid, grams | 22 | 22 | 22 | 22 | 22 |
| Acetaldehyde, grams | 60.9 | 0 | 30.45 | 121.9 | 0 |
| Ethanol, grams | 0 | 32 | 16.0 | 0 | 64 |
| Bromine, grams | 177.2 | 177.2 | 177.2 | 354.3 | 354.3 |
| Manganous Acetate Tetrahydrate, grams | 814.9 | 814.9 | 814.9 | 814.9 | 752 |
| Co:Mn:Br | 1:3:2.0 | 1:3:2 | 1:3:2 | 1:3:4 | * |

*Co:Ce:Mn:Br is 1:2.75:0.23:4

EXAMPLE 23

A portion of the solution prepared according to Example 16 and a portion of the solution prepared according to Example 21 are cooled, as will be described, with a slurry of crushed solid carbon dioxide in acetone. Each portion of said solution were placed in separate glass flasks having stirring devices and means for measuring the temperature of the liquid contents. Each flask was immersed at least to the level of its liquid contents in the slurry of solid $CO_2$ in acetone. Said slurry temperature was −40° C. The cooling of the solution of Example 16 to −10° C caused first crystals to form on inner flask wall and this solution solidified at −40° C. But upon warming the crystals disappeared (at −9 to −11° C) into a white opaque liquid but upon reaching a temperature of 33° C the liquid became clear and had the appearance of the original solution. The solution of Example 21 was cooled to −40° C without crystal deposition on the flask wall.

COMPARATIVE EXAMPLE I

In contrast to the foregoing, a clear solution is prepared at a temperature of 65° C from water, acetic acid, cobaltous acetate tetrahydrate and manganous acetate tetrahydrate in the proportions of 1089 grams of water, 22 grams of acetic acid, 278.5 grams of the cobaltous salt, and 814.9 grams of the manganous salt. One portion of this solution when cooled as described in Example 23 with the slurry of solid $CO_2$ in acetone first formed crystals on the flask at a temperature of −10° C and solidified at −40° C. However, when said solid was warmed an opaque white liquid formed just above −10° C, but did not become a clear solution at a temperature of 33° C or even at 65° C.

COMPARATIVE EXAMPLE II

A second portion of the solution prepared as described in Comparative Example I is stirred and held at 65° C while bromine liquid preheated to 50° C is injected into the solution to a Br:total metal gram atom ratio of 0.5:1.0. Shortly after the bromine began entering the solution a precipitate formed. After all the bromine had been added the precipitate was recovered. From its color and analysis it is recognized as being the hydrated manganous dioxide.

COMPARATIVE EXAMPLE III

A solution of manganous ions is prepared by stirring and heating 454 grams of water to 55° C. Thereafter 377 grams of finely ground manganous acetate tetrahydrate are slowly added to the stirred hot water. Stirring is continued until the solution is clear. Then 60.9 grams of bromine liquid preheated to 45° C is injected into the stirred clear solution. Again shortly after bromine began entering the solution a precipitate formed. After all the bromine is added, the total precipitate is recovered by filtration. From the color of the precipitate and its analysis the precipitate is the expected hydrated manganous dioxide.

The invention claimed is:

1. The method of preparation of an aqueous solution containing at least manganous and bromide ions from elemental bromine and a manganous compound other than manganous bromide which method comprises first dissolving at least 0.5 gram mole of an alcohol or at least one gram mole of an aldehyde or their proportionate equivalents as a mixture of alcohol or aldehyde per gram mole of elemental bromine to be dissolved, then dissolving the elemental bromine and thereafter adding to the resulting solution the non-bromide manganous salt.

2. The method of claim 1 wherein the alcohol is methanol.

3. The method of claim 1 wherein the alcohol is ethanol.

4. The method of claim 3 wherein the gram atom ratio of dissolved manganous ion to bromide ion is in the range of from 1.0:0.1 to 1.0:10 and based on one gram atom of manganous ion to be dissolved; the amount of ethanol first dissolved in water is at least from 0.5 to 5 gram mole.

5. The method of claim 1 wherein the aldehyde is formaldehyde.

6. The method of claim 1 wherein the aldehyde is acetaldehyde.

7. The method of claim 6 wherein the gram atom ratio of manganous ion and bromide ion to be dissolved is in the range of from 1.0:0.1 to 1.0:10 and based on one gram atom of manganous ion to be dissolved the amount of aldehyde first to be dissolved in water is at least from one to 10 gram moles.

8. The method of claim 6 wherein the solution is also to contain cobaltous ion in addition to manganous and bromide ions, the cobaltous salt source of cobaltous ion is dissolved in water containing at least one weight percent acetic acid before dissolving acetaldehyde.

9. The method of claim 3 wherein the solution is also to contain cobaltous ion in addition to manganous and bromide ions the cobaltous salt source of cobaltous ion is dissolved in water containing at least one weight percent acetic acid before dissolving ethanol.

* * * * *